United States Patent
Kato et al.

(10) Patent No.: US 10,142,032 B2
(45) Date of Patent: *Nov. 27, 2018

(54) TEMPERATURE INSENSITIVE DELAY LINE INTERFEROMETER

(71) Applicant: INPHI CORPORATION, Santa Clara, CA (US)

(72) Inventors: Masaki Kato, Palo Alto, CA (US); Radhakrishnan L. Nagarajan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,616

(22) Filed: Feb. 7, 2018

(65) Prior Publication Data

US 2018/0167146 A1    Jun. 14, 2018

Related U.S. Application Data

(63) Continuation of application No. 15/148,710, filed on May 6, 2016, now Pat. No. 9,929,814.

(51) Int. Cl.
| | |
|---|---|
| H04B 10/2507 | (2013.01) |
| H04B 10/67 | (2013.01) |
| H04J 14/02 | (2006.01) |
| H04B 10/69 | (2013.01) |
| G02B 6/12 | (2006.01) |

(Continued)

(52) U.S. Cl.
CPC ....... *H04B 10/677* (2013.01); *G02B 6/12007* (2013.01); *H04B 10/69* (2013.01); *H04J 14/02* (2013.01); *G02B 6/12028* (2013.01); *G02B 6/2813* (2013.01); *G02B 6/29344* (2013.01); *G02B 6/29352* (2013.01)

(58) Field of Classification Search
CPC ....... H04B 10/677; H04B 10/69; H04J 14/02; G02B 6/12007
See application file for complete search history.

(56) References Cited

U.S. PATENT DOCUMENTS

| | | | | |
|---|---|---|---|---|
| 2009/0136240 A1* | 5/2009 | Malouin | ............... | H04B 10/548 398/183 |
| 2010/0119189 A1* | 5/2010 | Nasu | ................. | G02B 6/12007 385/1 |

(Continued)

*Primary Examiner* — Tesfaldet Bocure
(74) *Attorney, Agent, or Firm* — Richard T. Ogawa; Ogawa P.C.

(57) ABSTRACT

A silicon photonics based temperature-insensitive delay line interferometer (DLI). The DLI includes a first arm comprising a first length of a first material characterized by a first group index corresponding to a first phase delay to transfer a first light wave with a first peak frequency and a second arm comprising a second length of a second material characterized by a second group index corresponding to a second phase to transfer a second light wave with a second peak frequency with a time-delay difference relative to the first light wave. The first phase delay and the second phase delay are configured to change equally upon a change of temperature. The time-delay difference between the first light wave and the second light wave is set to be inversed value of a free spectral range (FSR) to align at least the first peak frequency to a channel of a designated frequency grid.

20 Claims, 6 Drawing Sheets

(51) Int. Cl.
    *G02B 6/28*         (2006.01)
    *G02B 6/293*       (2006.01)

(56) References Cited

U.S. PATENT DOCUMENTS

| | | | |
|---|---|---|---|
| 2011/0176200 A1* | 7/2011 | Chen | H04B 10/677 |
| | | | 359/325 |
| 2011/0261437 A1* | 10/2011 | Chen | H04B 10/677 |
| | | | 359/325 |
| 2013/0322809 A1* | 12/2013 | Goh | H04B 10/5161 |
| | | | 385/3 |
| 2016/0363835 A1* | 12/2016 | Nagarajan | G02F 1/2257 |
| 2017/0285267 A1* | 10/2017 | Kato | G02B 6/278 |

* cited by examiner

TEMPERATURE INSENSITIVE DELAY LINE INTERFEROMETER

CROSS-REFERENCE TO RELATED APPLICATIONS

The present specification is a continuation of U.S. patent application Ser. No. 15/148,710, filed on May 6, 2016, now issued as U.S. Pat. No. 9,929,814 on Mar. 27, 2018, the entire contents of which are incorporated herein by reference.

BACKGROUND OF THE INVENTION

The present invention relates to optical communication techniques, more particularly, the present invention provides a temperature insensitive delay line interferometer based on silicon photonics waveguides.

Over the last few decades, the use of communication networks has exploded. In the early days Internet, popular applications were limited to emails, bulletin board, and mostly informational and text-based web page surfing, and the amount of data transferred was relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

40-Gbit/s and then 100-Gbit/s data rate dense-wavelength-division multiplexing (DWDM) optical transmission over existing single-mode fiber is a developing target for the next generation of fiber-optic communication networks. The big hang up so far has been the fiber impairments like chromatic dispersion that are slowing the communication signal down. Everything is okay up to 10 Gbits/s for distances less than 100 km and at 1300 nm transmission wavelength, but beyond that, distortion and attenuation take their toll. Many approaches are proposed on modulation methods for transmitting two or more bits per symbol so that higher communication rates can be achieved. Mach-Zehnder modulators can handle the higher data rates but require a driver that is differential with a wide output voltage swing. Beyond the light modulation for data transmission, the optical multiplexer (MUX) and de-multiplexer (DEMUX) of light signals is an essential building block for the optical network based on silicon photonics.

Silicon photonic devices can be made using existing semiconductor fabrication techniques, and because silicon-on-insulator is already used as the substrate for most integrated circuits, it is possible to create hybrid devices in which the optical and electronic components are integrated onto a single microchip. In particular, silicon photonic devices have been applied in WDM, including DWDM and CWDM (coarse-wavelength-division multiplexing), optical transmission networks, in which MUX/DEMUX wavelengths may be changed by environment temperature to cause problems to optical signals transmitted through the networks. A delay line interferometer (DLI) can be an important 2-channel MUX/DEMUX device with very low loss based on time-delayed two-beam interference in its two arms. In general, DLI is temperature sensitive because of the length difference between the two arms. However, the temperature sensitivity makes it difficult to use in uncooled environment. Extra control loop will be needed to track wavelengths or stay on wavelength grid, reducing its reliability and increasing cost in WDM application. Therefore, it is desired to develop temperature insensitive delay line interferometer for enhance its performance in WDM applications.

BRIEF SUMMARY OF THE INVENTION

The present invention relates to optical communication techniques. More particularly, the present invention provides a temperature insensitive delay line interferometer based on silicon photonics waveguides. Merely by example, the present invention discloses a temperature insensitive DLI device with hybrid arm materials and matching arm lengths and provides a method for achieving temperature self-compensation in the waveguide-based DLI used for two channels of a specified frequency grid very accurately in high speed DWDM optical communications, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a photonics device with temperature insensitive characteristics. The photonics device includes a first waveguide comprising a first length of a first material characterized by a first group index corresponding to a first phase delay for transferring a first light wave with a first peak frequency at an ambient temperature. Additionally, the photonics device includes a second waveguide comprising a second length of a second material characterized by a second group index corresponding to a second phase delay for transferring a second light wave with a second peak frequency with a time-delay difference relative to the first light wave at the same ambient temperature. The first phase delay and the second phase delay are configured to change by a same amount upon any change of the ambient temperature. The time-delay difference of the first light wave and the second light wave is equal to an inversed value of a free spectral range (FSR) configured to align the first peak frequency and the second peak frequency to two channels in a designated frequency grid.

In an alternative embodiment, the present invention provides a delay line interferometer with temperature insensitive characteristics. The delay line interferometer includes a first waveguide arm comprising a first plurality of segments connected in series to transfer a first light wave of a first peak frequency at an ambient temperature. Each of the first plurality of segments is characterized by one of the first plurality of lengths and a material-specific group index. Additionally, the delay line interferometer includes a heater disposed near at least one of the first plurality of segments to set a second temperature locally. Furthermore, the delay line interferometer includes a second waveguide arm comprising a second plurality of segments connected in series to transfer a second light wave of a second channel frequency with a time-delay difference relative to the first light wave at the same ambient temperature. Each of the second plurality of segments is characterized by one of the second plurality of lengths and a material-specific group index. A first change of phase-delay of the first waveguide arm for transferring the first light wave is configured to be equal to a second change of phase-delay of the second waveguide arm for transferring the second light wave upon any change of the ambient temperature. The time-delay difference between the first light wave and the second light wave is equal to an inversed value of a free spectral range (FSR) associated with a designated frequency grid. The second temperature is set above the ambient temperature to induce a frequency shift to align at least the first peak frequency to a channel frequency of the designated frequency grid.

In an alternative embodiment, the present invention provides a method for forming a temperature insensitive delay line interferometer. The method includes forming a first waveguide arm comprising a first length of a first material and a second length of a second material characterized by a second group index corresponding to a second phase delay. Additionally, the method includes forming a second waveguide arm comprising the first length of the first material and a third length of a third material characterized by a third group index corresponding to a third phase delay. The third phase delay and the second phase delay are set to change a same amount upon temperature change. The method further includes transferring a first light wave received from an input coupler through the first waveguide arm with a first peak frequency at a first temperature. Furthermore, the method includes transferring a second light wave received from the same input coupler through the second waveguide arm with a second peak frequency having a time-delay difference relative to the first light wave at the first temperature. The method further includes setting the time-delay difference to be equal to an inversed value of free spectral range (FSR) associated with a designated frequency grid. Moreover, the method includes disposing a heater on the first length of the first material to set a second temperature locally above the first temperature to induce a frequency shift to align at least the first peak frequency to one of channel frequencies of the designated frequency grid.

The present invention achieves these benefits and others in the context of known waveguide laser modulation technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
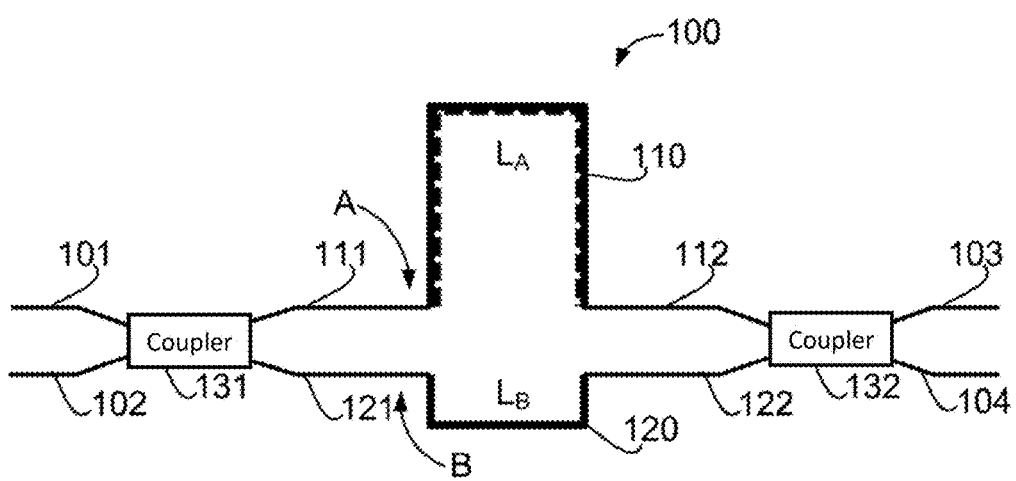
FIG. 1 is a simplified diagram of a temperature insensitive delay line interferometer (DLI) according to an embodiment of the present invention.

The present invention relates to optical communication techniques. More particularly, the present invention provides a temperature insensitive delay line interferometer based on silicon photonics waveguides. Merely by example, the present invention discloses a temperature insensitive DLI device with hybrid arm materials and matching arm lengths and provides a method for achieving temperature self-compensation in the waveguide-based DLI used for two channels of a specified frequency grid very accurately in high-speed low-loss DWDM optical communications, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram of a temperature insensitive delay line interferometer (DLI) according to an embodiment of the present invention. This diagram is merely an example, which should not unduly limit the scope of the claims. One of ordinary skill in the art would recognize many variations, alternatives, and modifications. As shown, a delay line interferometer (DLI) 100 is conceptually disposed between two Multimode Interference (MMI) couplers 131 and 132. The DLI device 100 includes two arms, arm A and arm B, for carrying two equal-intensity light beams with respective two peak frequencies split from a first MMI coupler 131. One of the two light beams as traveling through the two arms is delayed in phase compared to another before being combined again at a second MMI coupler 132 where the two light beams interfere with each other constructively or destructively to yield an intensity-keyed output signal stream of two frequencies. The materials for forming the arm A and arm B can be conventional optical fiber or semiconductor waveguide made by silicon or silicon nitride or other suitable materials formed on a common silicon or silicon-on-insulator substrate. Note, the figure is merely a schematic illustration. The right angled arms are not indented to represent true fiber or waveguide layout configurations.

In an embodiment, the first MMI coupler 131 is set to be a 1×2 splitter coupler (or a 2×2 coupler with one input port being terminated) so that the incoming light beam with potentially all wavelengths in grid can be fed into one input port, e.g., port 101, with another input port being terminated. At the same time the second MMI coupler 132 is configured to be a 2×2 coupler with two output ports 103 and 104. Thus, the DLI device 100 is configured to be a 2-channel DEMUX device or specifically a deinterleaver, with two output ports outputting two equal-intensity light waves with respective two peak frequencies having a relative phase delay. In an alternative embodiment, the first MMI coupler 131 can be set to be a 2×2 coupler while the second MMI coupler 132 is set to a 2×1 combiner coupler (e.g., with one output port 103 being terminated or used as a tap port) so as to make the DLI device 100 a 2-channel MUX device or an interleaver to combine two light waves with respective two peak frequencies at two DWDM channels into a composite signal stream.

Figure 2:
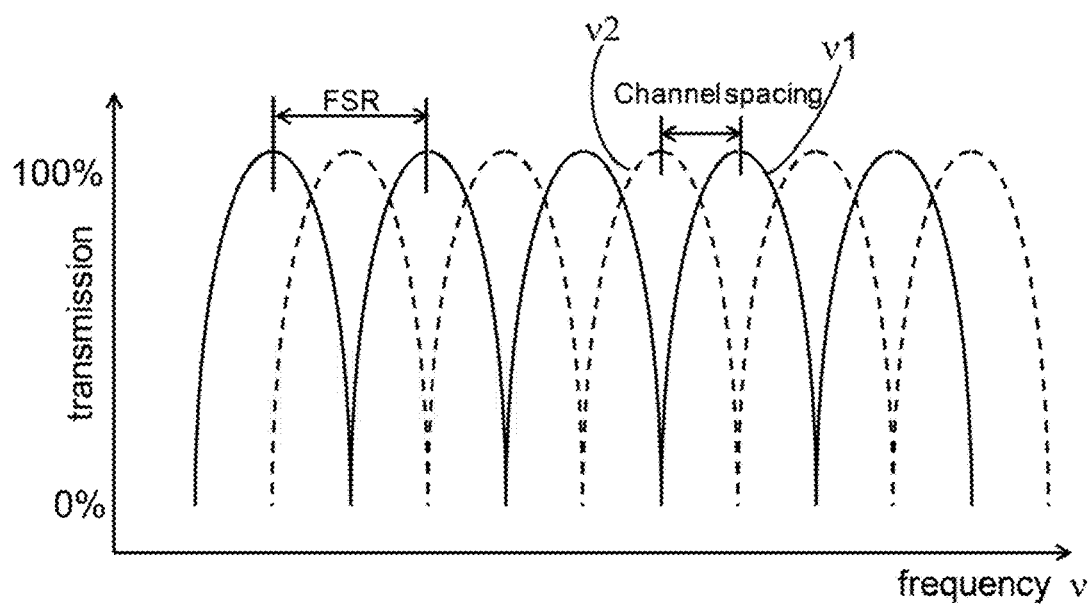
FIG. 2 is a schematic diagram illustrating a free spectral range associated with the DLI of FIG. 1 according to an embodiment of the present invention.

In general, the two peak frequencies for the DLI device 100 can be set to two dense wavelength-division multiplexing (DWDM) channels of the ITU grid or any smallest spaced channels or wide spaced CWDM channels in a designated frequency grid. The DLI device 100 is associated with an intrinsic free spectral range (FSR) determined by the time-delay difference between the two arms for any wavelength of the equal to a spacing in optical frequency or wavelength between two successive transmitted optical signal interference maxima. FIG. 2 is a schematic diagram illustrating a free spectral range associated with the DLI of FIG. 1 for multiplexing or de-multiplexing two frequency channels v1 and v2 according to an embodiment of the present invention. For DWDM applications with ITU grid, channel spacing is typically 100 GHz, or 50 GHz, or 25 GHz, or 12.5 GHz, or alternatively be extremely small as 5 GHz or even 2.5 GHz, the corresponding desired FSR value for the DLI device is just twice of the channel spacing. Alternatively, this DLI device 100 is also applicable for CWDM applications such that the channel spacing of the two operational frequencies can be selected from 200 GHz or 400 GHz. Ideally, the DLI is configured with a proper time-delay difference associated with the two arms as the two peak frequencies are aligned to the two channel frequencies of the designated frequency grid. But there can be an offset that is smaller than the channel spacing.

Referring to FIG. 1, the DLI device 100 is configured to be a temperature insensitive DLI with the two arms A and B made by different or hybrid materials in respective matching lengths. In a specific embodiment, arm A and arm B can be multiple waveguide sections made by two or more different materials and with some waveguide sections in a same material so that arm A includes a net waveguide length of $L_A$ of material A corresponding to arm B having a net waveguide length of $L_B$ of material B after those waveguide sections with the same material of a common length being canceled out. In certain embodiment, arm A is only formed by material A and arm B is only made by material B.

For example, arm A is a waveguide including a section 111, a section 110, and a section 112, where the section 111 and the section 112 are made of a same first material while the section 110 is made of a second material of the length $L_A$. Similarly, arm B is another waveguide including a section 121, a section 120, and a section 122, where the section 121 and the section 122 are made of the same first material with a combined length equal to that of combined section 111 and section 112. The section 120 is made of a third material of a length $L_B$. Thus, the net difference between the arm A and the arm B is characterized by the length $L_A$ of the second material versus the length $L_B$ of the third material. In addition, the second material is characterized by a group index $N_A$ which corresponds to an index change $\Delta N_A$ associated with a temperature change $\Delta T$. Accordingly, a phase delay change $L_A \cdot \Delta N_A$ of is induced in the arm A by this temperature change $\Delta T$. Similarly, the third material is characterized by a group index $N_B$ which corresponds to an index change $\Delta N_B$ and accordingly a phase delay change of $L_B \cdot \Delta N_B$ associated with the same temperature change $\Delta T$. In an embodiment, the third material could be the same as or different from the first material. The use of those sections of 111, 112, or 121, 122 is for adding other features or components to one or both arms of the temperature insensitive DLI device. In certain application, these sections can be eliminated.

In an embodiment, the temperature insensitive DLI 100 is configured to have their characteristic group indices, index changes due to the same temperature change, lengths, and free spectral range to satisfy the following two restriction requirements:

$$\Delta N_A \cdot L_A = \Delta N_B \cdot L_B \quad (1)$$

$$\frac{L_A}{(c/N_A)} - \frac{L_B}{(c/N_B)} = \frac{1}{FSR} \quad (2)$$

where c is speed of light. Equation (1) just ensures a nature of temperature insensitiveness of this DLI device, based on which the phase delay changes among the two waveguide arms remain the same no matter how environmental temperature changes. In one or more embodiments, the Equation (1) is applicable for wide range of WDM operation wavelengths and the temperature dependency of the group indices of wide selection of materials stay in such a linear variation mode in extended ranges for WDM applications. Equation (2) is merely to retain a basic phase delay restriction for any DLI device with its intrinsic FSR defined in FIG. 2 associated with a designated frequency grid (e.g, for DWDM or CWDM applications), no matter it is made by same type of material or by hybrid materials.

In a specific embodiment, silicon nitride and silicon are materials respectively selected for forming waveguides of two arms of the DLI device. Silicon has been widely used to form arrayed waveguide with low insertion loss and high manufacturability in silicon photonics devices applied in high-speed optical communication. The temperature dependency of group index for silicon is well characterized to be a linear relation with the index change coefficient of $\Delta N_{Si}=2\times10^{-4}/°$ C. Silicon nitride also is a photonic material having a higher value in group index with less temperature dependency. The temperature dependency of group index for silicon nitride is characterized to be also a linear relation with the index change coefficient of $\Delta N_{SiN}=2\times10^{-5}/°$ C.

Either one or both silicon and silicon nitride hybrid can be selected to form either arm of the DLI device. In an example, all sections of arm A are made by silicon nitride of a length $L_{SiN}$ and all sections of arm B are made by silicon of a length $L_{Si}$. In another example, all common waveguide sections (such as section 111 and 112 of the arm A and section 121 and 122 of the arm B can be made by silicon material while the section 110 of arm A is specifically chosen to use silicon nitride material with a length $L_{SiN}$. At the same time, all common sections of arm B are made by silicon material to be the same as that for arm A while the section 120 is chosen to still use silicon material of a length $L_{Si}$ to be distinguished from that of section 110. In a specific embodiment, once a length ratio of $L_{Si}:L_{SiN}=1:10$ is chosen, which corresponds to a same ratio for the net lengths of material A in arm A and material B in arm B, the Equation (1) will be satisfied given the index change coefficients for both silicon and silicon nitride material as shown above. Of course, different choices of materials in arm A and arm B lead to different matching length ratio to meet the requirement of Eq. (1). In other words, these material/mechanical configurations of arm A and arm B directly lead to a temperature insensitive DLI device. Of course, Equation (2) needs to be satisfied too as the DLI device for specific WDM operational wavelength band.

Figure 3:
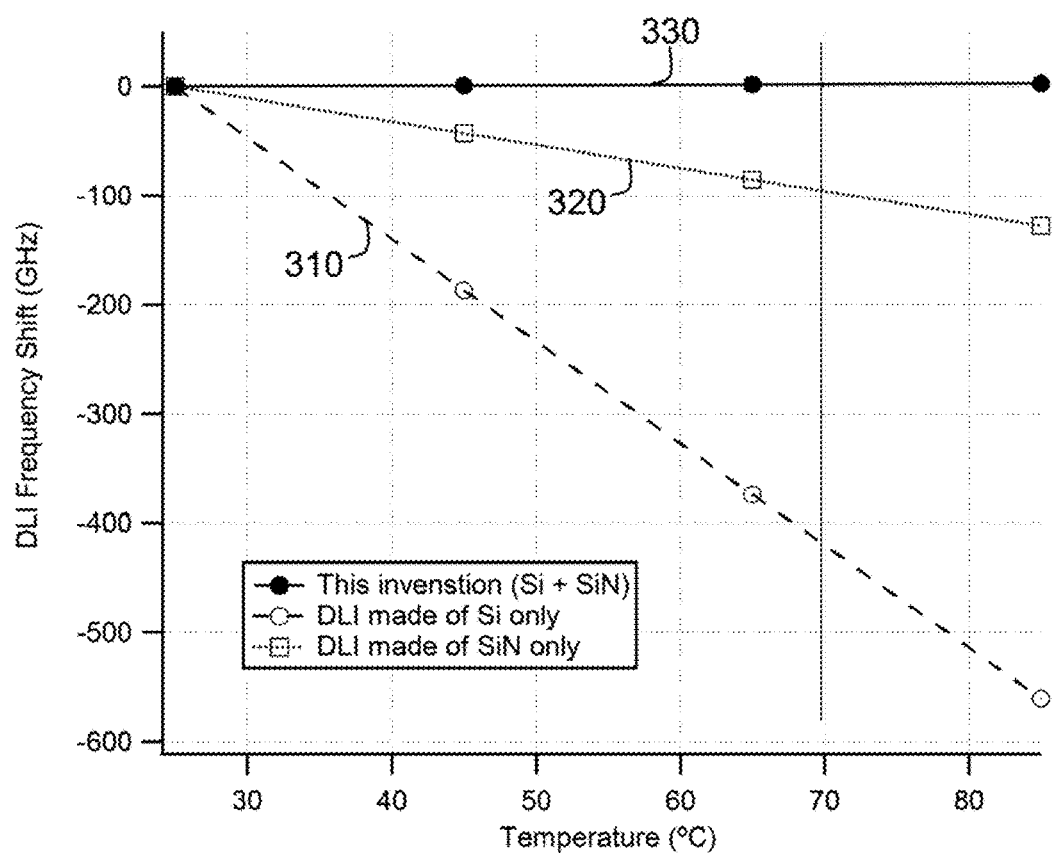
FIG. 3 is an exemplary chart showing temperature dependency of frequency shift of DLI made by different materials according to an embodiment of the present invention.

FIG. 3 is an exemplary chart showing temperature dependency of frequency shift of DLI made by different materials according to an embodiment of the present invention. As shown, frequency shifts of the DLI devices made by different materials are plotted against temperature. Multiple data points of three types of DLI devices are measured at about room temperature ~25° C., 45° C., 65° C., and 85° C. Linear regression lines are plotted for each set of data. Dashed line 310 corresponds to temperature dependency of frequency shift of a DLI made by silicon only, which has a steepest slope of −9 GHz/° C. Dotted line 320 corresponds to temperature dependency of frequency shift of another DLI made by silicon nitride only, giving a much smaller slope of −2 GHz/° C. This indicates that DLI device made by silicon nitride material is less temperature sensitive. Further, the solid line 330 corresponds to temperature dependency of frequency shift of a third DLI made by silicon and silicon nitride hybrid material (specifically, e.g., arm A is made of silicon nitride and arm B is made of silicon) with properly matched lengths in desired ratio, yielding a substantially zero slope and representing a DLI that is completely insensitive to temperature.

Figure 4:
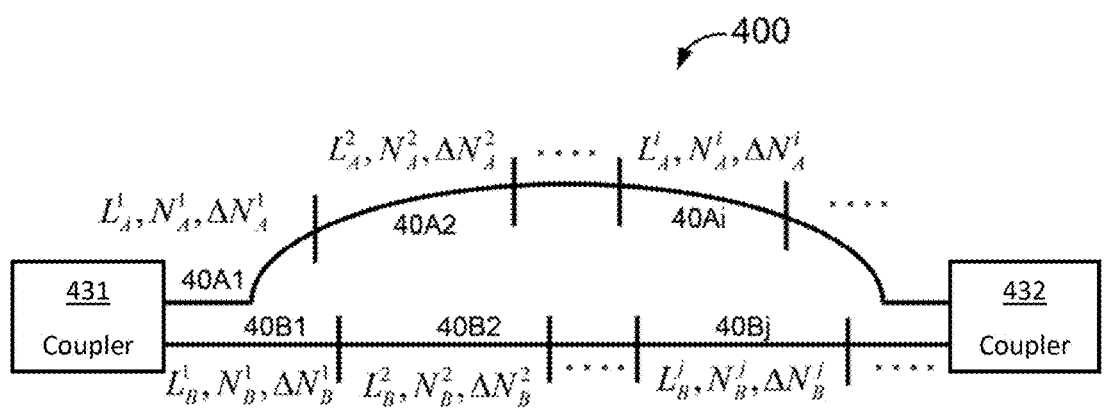
FIG. 4 is a simplified diagram of a temperature insensitive DLI according to another embodiment of the present invention.

FIG. 4 is a simplified diagram of a temperature insensitive DLI according to another embodiment of the present invention. This diagram is merely an example, which should not unduly limit the scope of the claims. One of ordinary skill in the art would recognize many variations, alternatives, and modifications. As shown, a device 400 is provided with two waveguide arms A and B disposed between two MMI couplers 431 and 432. Waveguide arm A is configured to be an arbitrary number of serial connected waveguide sections 40A1, 40A2, . . . 40Ai . . . . Each waveguide section in arm A is characterized by the parameters including at least a distinct length $L_A$, a material-specific group index $N_A$, and a temperature-change-induced index change $\Delta N_A$. Similarly, waveguide arm B is configured to be another arbitrary number (may be or may not be equal to the number of waveguide arm A) of serial connected waveguide sections 40B1, 40B2, . . . 40Bj . . . . Each waveguide section in arm A is characterized by the following parameters including at least a distinct length $L_B$, a material-specific group index $N_B$, and a temperature-change-induced index change $\Delta N_B$. In the embodiment, the device 400 as configured to be a temperature insensitive delay line interferometer by restricting the parameters for each of all waveguide sections of each arm to the following conditions:

$$\sum_i \Delta N_A^i \cdot L_A^i = \sum_j \Delta N_B^j \cdot L_B^j \qquad (3)$$

$$\sum_i \frac{L_A^i}{(c/N_A^i)} - \sum_j \frac{L_B^j}{(c/N_B^j)} = \frac{1}{FSR} \qquad (4)$$

Similar to Eq. (1), Eq. (3) is to ensure that total phase delay change due to group index change in each section of arm A induced by a temperature change will be equal to the total phase delay change due to ground index change in each section of arm B induced by the same temperature change. This is essential to achieve temperature insensitive functionality. Eq. (4), like the Eq. (2), is an natural requirement for the DLI device to be configured with its time-delay difference between two light waves respectively traveling through arm A and arm B being restricted by its characteristic free spectra range FSR. Ideally, the DLI device is configured to have a first light wave traveling through the arm A with a first frequency at one channel of a frequency grid defined by the FSR and a second light wave traveling through the arm B with a second frequency at another channel of the same frequency grid. In an embodiment, the difference between the first frequency and the second frequency is set to no smaller than half value of the FSR.

Figure 5:
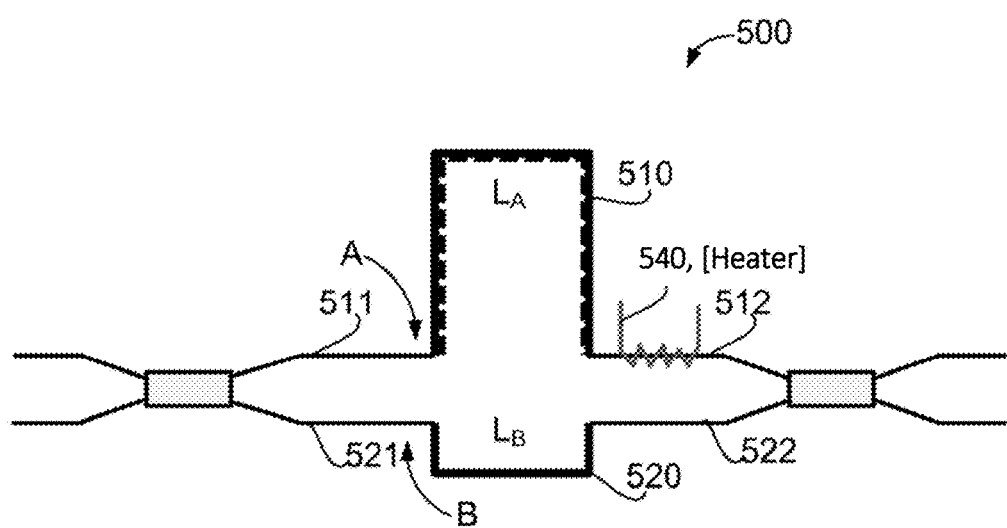
FIG. 5 is a simplified diagram of a temperature insensitive DLI with wavelength locking heater according to another embodiment of the present invention.

FIG. 5 is a simplified diagram of a temperature insensitive delay line interferometer with wavelength locking heater according to another embodiment of the present invention. This diagram is merely an example, which should not unduly limit the scope of the claims. One of ordinary skill in the art would recognize many variations, alternatives, and modifications. As shown, a temperature insensitive delay line interferometer 500 is provided substantially the same as the DLI device 100 with an additional heater 540 being added to one section of arm A. Like the DLI device 100 as seen in FIG. 1, DLI device 500 of FIG. 5 also includes some waveguide sections (511, 512, 521, 522) that are made of the same first material in a same length, while keeping a first net differential section 510 in arm A made by the second material in length $L_A$ corresponding to second net differential section 520 in arm B made by the third material (can be the same or different from the first material) in length $L_B$. The second material in arm A of length $L_A$ and the third material in arm B of length $L_B$ are optimized to satisfy Eq. (1) and Eq. (2) to make the DLI device 500 completely temperature insensitive.

Referring to FIG. 5, the DLI device 500 can be used as an interleaver/deinterleaver structure when properly implemented with a 2×1 or 2×2 MMI couplers in input or output ports, which can then be held on a specified frequency grid very accurately as a 2-channel MUX/DEMUX device in WDM optical communication applications. Although the DLI device is temperature insensitive, we still need a heater to align the DLI device to a designated frequency grid, for example, ITU grid of DWDM channels in C-band or wide-spaced CWDM channels. As shown in FIG. 5, the heater 540 is used to vary the temperature of one of the arms, for example, arm A of the DLI device 500. The temperature changes the material refractive index of the arm which in turn shifts the peak frequency according to following equation:

$$\Delta f = \frac{FSR}{\lambda} \Delta n(T) \cdot L \qquad (3)$$

where λ is a particular one wavelength of the designated grid, Δn(T) is material refractive index change caused by heater-induced temperature change, and L is the length of the heater applied on a corresponding waveguide section of the arm. Within the tuning temperature range of the heater, the phase delay of the DLI device can be adjusted to compensate an offset of the two peak frequencies to allow them being aligned to a desired frequency grid for particular WDM applications. As seen from FIG. 3, for heater disposed at silicon waveguide section, about 10° C. temperature change can result in about 100 GHz frequency shift which is enough to handle any possible requirement for grid alignment. Once the alignment to the desired frequency grid is done, the heater 340 will maintain a constant power while the DLI device 500 is held at a fixed grid independent of the temperature.

The heater 540 is preferred to be installed near a waveguide section made by a material that is more sensitive to temperature change. For a DLI device with one arm in silicon nitride material and another arm in silicon material, additional Si material is incorporated in the silicon nitride arm of the DLI to implement the heater. Since silicon nitride material is not as sensitive to temperature as silicon material is, the heater implemented on the added silicon waveguide section is more power efficient. This additional silicon waveguide length in arm A (primarily made by silicon nitride) is then compensated on corresponding length of the silicon arm B of the DLI. In another specific embodiment, each waveguide arm of the DLI device includes a silicon waveguide section that is implemented with a heater for tuning temperature for achieve wavelength locking as described above (although in principle one heater is enough to tune the phase delay of the DLI device).

Figure 6:
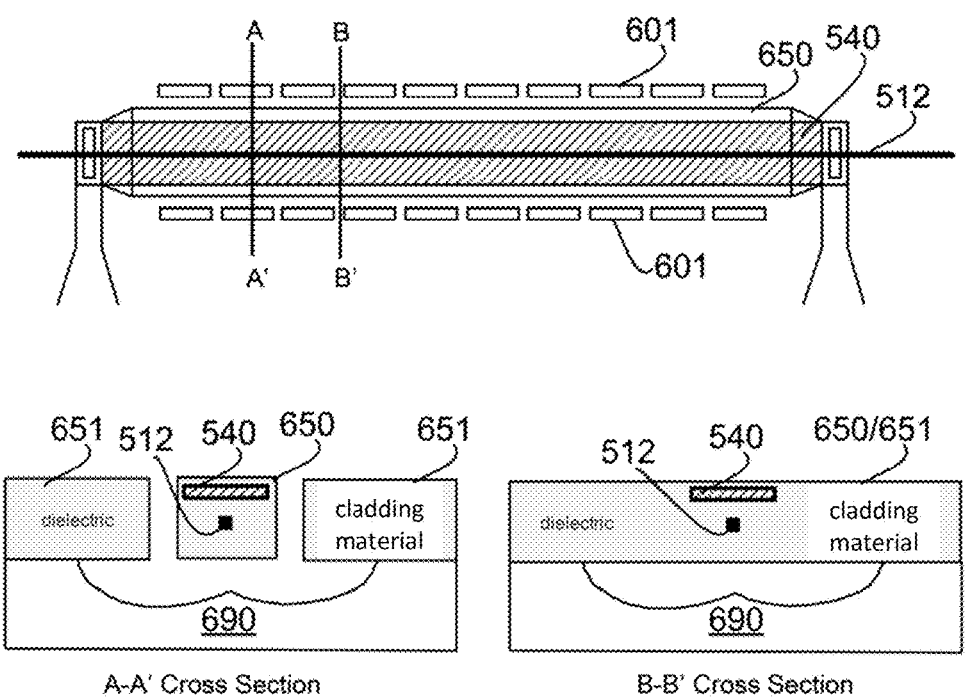
FIG. 6 is a simplified diagram showing the heater in the DLI of FIG. 5 being disposed near a waveguide both embedded in an insulator cladding material isolated from nearby cladding and substrate according to an embodiment of the present invention.

FIG. 6 is a simplified diagram showing the heater in the DLI of FIG. 5 being disposed near a waveguide both embedded in an insulator cladding material isolated from nearby cladding and substrate according to an embodiment of the present invention. This diagram is merely an example, which should not unduly limit the scope of the claims. One of ordinary skill in the art would recognize many variations, alternatives, and modifications. As shown, in a specific embodiment, the heater 540 is disposed near the waveguide section 512 and both of them are embedded in an insulator cladding material 650. In an embodiment, the insulator cladding material 650 utilizes directly the insulator material in a SOI substrate, typically silicon oxide, from which the waveguide section 512, typically a silicon waveguide, is formed and embedded therein. After the waveguide section 512 is formed and covered by a layer of cladding material 650, the heater 540 is added above that layer of cladding material 650 with a length extended up to a full length of the waveguide section 512 and a width preferably several times wider than the waveguide section 512. Then the heater 540 is again passivated by another layer of the same insulator cladding material 650.

In an alternative embodiment, the embedded heater/waveguide combination is further processed to be partially isolated from nearby cladding material and substrate material by etching off partial cladding material on both sides and substrate material underneath. Referring to FIG. 6 again, multiple etch windows 601 are patterned along two sides of the embedded heater/waveguide combo structure 540/541. Each etch window 601 is separated from each other by a gap to retain a small portion of cladding material 650 to connect with nearby cladding material 651. Each etch window 601 allows partial removals of cladding material 650 and substrate material 690 to form multiple voids on partial side regions and an entire underneath region of the embedded heater/waveguide combo structure 540/541. The main portion of the embedded heater/waveguide combo structure 540/541 is then fully separated by the etch-off voids from the nearby cladding material 651 (as seen in AA' cross sectional view in FIG. 6 and fully suspended from the underneath, Si, substrate material. These etch-off voids can be filled by good thermal insulation material or simply left with air as air itself is good thermal insulation material. Thermal conduction is limited to a few small connections of cladding material retained on both sides and serial connections between this heater/waveguide 540/512 and one or two neighboring waveguides (e.g., silicon nitride waveguide 510 as seen in FIG. 5) with a much reduced cross section area. Therefore, very good thermal isolation is achieved with this particular one of silicon waveguide section 512 at which the temperature can be controlled by the heater 540 locally without affecting rest part of waveguide sections in both arms of the DLI device. The silicon nitride waveguide section 510, even it belongs to the same waveguide arm A, can be maintained substantially at an ambient temperature. Since the heater 540 is merely to set a temperature locally for wavelength locking, the rest part of waveguide arm A and the whole arm B are subjected to a same ambient temperature change without being affected by the local temperature set by the heater 540 in waveguide section 512. Therefore, the Equation (1) and (2) are still satisfied under one common ambient environmental temperature for this temperature insensitive DLI device. The heater 540 is only to provide a wavelength tuning and locking mechanism for the DLI device 500 to ensure it operates at a desired frequency grid.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A photonics optical system comprising:
   a photonics device with temperature insensitive characteristics comprising:
   a first waveguide comprising a first length of a first material characterized by a first group index corresponding to a first phase delay for transferring a first light wave with a first peak frequency at an ambient temperature;

a second waveguide comprising a second length of a second material characterized by a second group index corresponding to a second phase delay for transferring a second light wave with a second peak frequency with a time-delay difference relative to the first light wave at the same ambient temperature;
  wherein the first phase delay and the second phase delay are configured to change by a same amount upon any change of the ambient temperature, and the time-delay difference of the first light wave and the second light wave is equal to an inversed value of a free spectral range (FSR) configured to align the first peak frequency and the second peak frequency to two channels in a designated frequency grid; and
  a network.

2. The photonics system of claim 1 wherein the first waveguide and the second waveguide are formed in a same SOI substrate and embedded separately in a dielectric insulator cladding material at least partially isolated from silicon body of the SOI substrate.

3. The photonics system of claim 1 wherein the first material comprises a mixture of silicon oxide and silicon nitride with a mixing ratio ranging from 1% wt silicon nitride to 100% wt silicon nitride and correspondingly the second material consists of silicon.

4. The photonics system of claim 1 wherein the first material comprises a glass material having a group index larger than that of silicon oxide and transparency characteristics for the first light wave and correspondingly the second material consists of silicon.

5. The photonics system of claim 1 wherein the first peak frequency and the second peak frequency correspond to two channels of dense wavelength-division multiplexing (DWDM) ITU grid or wide-spaced coarse wavelength-division multiplexing (CWDM) grid with a mutual frequency offset no smaller than half of the FSR.

6. The photonics device of claim 5 wherein the FSR is selected from 400 GHz, 200 GHz, 100 GHz, 50 GHz, 25 GHz, 12.5 GHz, 5 HGz, and 2.5 GHz.

7. The photonics system of claim 1 is a delay line interferometer configured to be an interleaver having the first waveguide and the second waveguide respectively coupled with an input multi-mode interference coupler in either a 1×2 or a 2×2 configuration and an output multi-mode interference coupler in a 2×1 combiner configuration for combining two frequency channels into one composite signal stream.

8. The photonics system of claim 1 is a delay line interferometer configured to be a deinterleaver having the first waveguide and the second waveguide respectively coupled with an input multi-mode interference coupler in either a 1×2 splitter or a 2×2 configuration and an output multi-mode interference coupler in a 2×2 configuration for separates a denser signal mixed with two frequencies into two separate channels of the designated frequency grid.

9. The photonics system of claim 1 wherein the first waveguide and the second waveguide respectively comprise a first extra section and a second extra section both made of a third material with a third length.

10. The photonics device of claim 9 further comprising a heater disposed over the third length of the first extra section that is thermally isolated from the first length of the first material and the second length of the second material for generating a local-temperature-induced frequency shift to compensate any offset of the first peak frequency away from a standard channel frequency of the designated frequency gird caused by the change of the ambient temperature.

11. A system comprising:
  a delay line interferometer with temperature insensitive characteristics comprising:
  a first waveguide arm comprising a first plurality of segments connected in series to transfer a first light wave of a first peak frequency at an ambient temperature, each of the first plurality of segments being characterized by one of the first plurality of lengths and a material-specific group index;
  a heater disposed near at least one of the first plurality of segments to set a second temperature locally;
  a second waveguide arm comprising a second plurality of segments connected in series to transfer a second light wave of a second channel frequency with a time-delay difference relative to the first light wave at the same ambient temperature, each of the second plurality of segments being characterized by one of the second plurality of lengths and a material-specific group index;
  wherein a first change of phase-delay of the first waveguide arm for transferring the first light wave is configured to be equal to a second change of phase-delay of the second waveguide arm for transferring the second light wave upon any change of the ambient temperature, and the time-delay difference between the first light wave and the second light wave is equal to an inversed value of a free spectral range (FSR) associated with a designated frequency grid, and the second temperature is set above the ambient temperature to induce a frequency shift to align at least the first peak frequency to a channel frequency of the designated frequency grid; and
  a network.

12. The system of claim 11 wherein the first waveguide arm and the second waveguide arm are formed in a common SOI substrate and isolated from each other by an insulator cladding material made by silicon oxide.

13. The system of claim 12 wherein the first plurality of segments comprises a first segment made by a mixture of silicon oxide and silicon nitride with a mixing ratio ranging from 1% wt silicon nitride to 100% wt silicon nitride connected to the at least one of the first plurality of segments made by silicon and correspondingly the second plurality of segments comprises a third segment made by silicon and at least a third segment made by silicon having a same length as the at least one of the first plurality of segments.

14. The system of claim 11 wherein the first peak frequency and the second peak frequency correspond two dense wavelength-division multiplexing (DWDM) channels selected from a standard ITU grid with a mutual frequency offset no smaller than half of the FSR.

15. The system of claim 14 wherein the FSR is selected from 400 GHz, 200 GHz, 100 GHz, 50 GHz, 25 GHz, 12.5 GHz, 5 HGz, and 2.5 GHz.

16. The system of claim 14 wherein the second temperature is set to induce a frequency shift less than half value of the FSR.

17. The system of claim 13 wherein the heater comprises a same length as the at least one of the first segments embedded in a same block of insulator cladding material made by silicon oxide substantially isolated thermally from nearby cladding material and suspended from silicon substrate underneath by one or more partial etch-off structures.

18. A method for forming an optical device, the method comprising a method of forming a temperature insensitive delay line interferometer, the method comprising:

forming a first waveguide arm comprising a first length of a first material and a second length of a second material characterized by a second group index corresponding to a second phase delay;

forming a second waveguide arm comprising the first length of the first material and a third length of a third material characterized by a third group index corresponding to a third phase delay, the third phase delay and the second phase delay being set to change a same amount upon temperature change;

transferring a first light wave received from an input coupler through the first waveguide arm with a first peak frequency at a first temperature;

transferring a second light wave received from the same input coupler through the second waveguide arm with a second peak frequency having a time-delay difference relative to the first light wave at the first temperature;

setting the time-delay difference to be equal to an inversed value of free spectral range (FSR) associated with a designated frequency grid;

disposing a heater on the first length of the first material to set a second temperature locally above the first temperature to induce a frequency shift to align at least the first peak frequency to one of channel frequencies of the designated frequency grid.

19. The method of claim 18 wherein the first material is made of silicon, the second material is made of a composite material mixed with silicon nitride and silicon oxide, and the third material is made of silicon, respectively formed in a planar silicon-on-insulator substrate.

20. The method of claim 18 further comprising maintaining the heater at a constant power to lock the first peak frequency once it is aligned to the one of channel frequencies of the designated frequency grid.

\* \* \* \* \*